United States Patent
Malladi et al.

(10) Patent No.: US 8,948,208 B2
(45) Date of Patent: Feb. 3, 2015

(54) CONVEYING INFORMATION THROUGH PHASE OFFSET ON PSS RELATIVE TO DL-RS

(75) Inventors: Durga Prasad Malladi, San Diego, CA (US); Juan Montojo, San Diego, CA (US); Amir Farajidana, San Diego, CA (US); Kapil Bhattad, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 905 days.

(21) Appl. No.: 12/611,620

(22) Filed: Nov. 3, 2009

(65) Prior Publication Data

US 2010/0118839 A1    May 13, 2010

Related U.S. Application Data

(60) Provisional application No. 61/112,356, filed on Nov. 7, 2008.

(51) Int. Cl.
  *H04L 27/26*  (2006.01)
  *H04J 11/00*  (2006.01)
  *H04B 7/06*  (2006.01)

(52) U.S. Cl.
  CPC ............ *H04J 11/00* (2013.01); *H04B 7/0617* (2013.01); *H04L 27/261* (2013.01)
  USPC ..................................................... 370/503

(58) Field of Classification Search
  USPC ............. 370/215, 310.2, 328–339, 349, 370/516–519; 455/23, 42, 60, 139, 205, 455/276.1, 304, 422.1; 375/269, 273, 375/279–284, 308, 323, 329–333, 362–376
  See application file for complete search history.

(56) References Cited

U.S. PATENT DOCUMENTS

| | | | |
|---|---|---|---|
| 2004/0008758 A1* | 1/2004 | Ando ............................ | 375/150 |
| 2008/0205375 A1* | 8/2008 | Onggosanusi et al. ....... | 370/350 |
| 2008/0268885 A1 | 10/2008 | Onggosanusi et al. | |
| 2008/0274753 A1* | 11/2008 | Attar et al. ................. | 455/456.6 |
| 2008/0291892 A1* | 11/2008 | Luo ............................... | 370/350 |
| 2009/0046671 A1* | 2/2009 | Luo ............................... | 370/336 |
| 2009/0080407 A1* | 3/2009 | Onggosanusi et al. ....... | 370/350 |

(Continued)

FOREIGN PATENT DOCUMENTS

| | | |
|---|---|---|
| TW | 200814693 A | 3/2008 |
| WO | WO2008103981 | 8/2008 |

OTHER PUBLICATIONS

3GPP TS 36.211 v8.4.0 (Sep. 2008), 3rd Generation Partnership Project; Technical Specification Group Radio Access Network; Evolved Universal Terrestrial Radio Access (E-UTRA); Physical Channels and Modulation (Release 8), Sep. 2008, 3GPP.*

(Continued)

*Primary Examiner* — Hoon J Chung
(74) *Attorney, Agent, or Firm* — Larry Moskowitz

(57) ABSTRACT

Systems and methodologies are described that facilitate conveying information utilizing a constant phase offset on Primary Synchronization Signal (PSS). In general, the subject innovation can employ a fixed set of beams and phases in which a PSS and a Secondary Synchronization Signal (SSS) can be transmitted with the fixed set of beams and phases. Furthermore, the phase offset for PSS and SSS can be the same such that legacy user equipment is unaffected or aware of such transmissions.

34 Claims, 10 Drawing Sheets

(56) References Cited

U.S. PATENT DOCUMENTS

| | | |
|---|---|---|
| 2009/0131037 A1* | 5/2009 | Malladi et al. ............ 455/422.1 |
| 2009/0135804 A1* | 5/2009 | Swarts et al. ................ 370/350 |
| 2009/0310782 A1* | 12/2009 | Dabak et al. ................. 380/255 |
| 2010/0027691 A1* | 2/2010 | Kent ............................ 375/260 |
| 2010/0069119 A1* | 3/2010 | Mueck et al. ................ 455/561 |
| 2010/0135257 A1* | 6/2010 | Higuchi et al. .............. 370/336 |
| 2010/0182903 A1* | 7/2010 | Palanki et al. ............... 370/225 |
| 2011/0007657 A1* | 1/2011 | Kazmi et al. ................. 370/252 |
| 2011/0128872 A1* | 6/2011 | Lindoff ........................ 370/252 |
| 2011/0129008 A1* | 6/2011 | Chmiel et al. ............... 375/224 |

OTHER PUBLICATIONS

International Search Report and Written Opinion—PCT/US2009/063632—ISA/EPO—Mar. 3, 2010.
Taiwan Search Report—TW098137951—TIPO—Jan. 8, 2013.
Taiwan Search Report—TW097116375—TIPO—May 21, 2013.

* cited by examiner

CONVEYING INFORMATION THROUGH PHASE OFFSET ON PSS RELATIVE TO DL-RS

CROSS-REFERENCE TO RELATED APPLICATIONS

This application claims the benefit of U.S. Provisional Patent application Ser. No. 61/112,356 entitled "CONVEYING INFORMATION THROUGH PRIMARY SYNCHRONIZATION SIGNAL SHIFT" which was filed Nov. 7, 2008. The entirety of the aforementioned application is herein incorporated by reference.

BACKGROUND

I. Field

The following description relates generally to wireless communications, and more particularly to conveying information through phase offset on primary synchronization signal (PSS).

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

A base station (e.g., an eNodeB, a NodeB, etc.) within a Long Term Evolution (LTE) environment can utilize a Primary Synchronization Signal (PSS). The PSS can be transmitted by the base station on a periodic basis and typically is a specified length sequence. For example, the PSS can be a length 62 sequence and be transmitted every five (5) milliseconds (ms). Moreover, there can be three (3) potential PSS sequences, wherein the PSS sequence transmitted can be dependent upon a physical cell identification (ID) of the base station. In other words, the physical cell identification (ID) can correspond to a PSS sequence for each base station within the LTE environment.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

According to related aspects, a method that facilitates configuring a fix set of beams and phases for transmitting Primary Synchronization Signal (PSS) and Secondary Synchronization Signal (SSS). The method can include identifying a beam within a wireless communications environment. Further, the method can include employing a fixed number of phases for the beam. Moreover, the method can comprise transmitting at least one of a Primary Synchronization Signal (PSS) or a Secondary Synchronization Signal (SSS) with the fixed number of phases for the beam.

Another aspect relates to a wireless communications apparatus. The wireless communications apparatus can include at least one processor configured to identify a beam within a wireless communications environment, employ a fixed number of phases for the beam, and transmit at least one of a Primary Synchronization Signal (PSS) or a Secondary Synchronization Signal (SSS) with the fixed number of phases for the beam. Further, the wireless communications apparatus can include memory coupled to the at least one processor.

Yet another aspect relates to a wireless communications apparatus that enables configuration of a fix set of beams and phases for transmitting Primary Synchronization Signal (PSS) and Secondary Synchronization Signal (SSS). The wireless communications apparatus can include means for identifying a beam within a wireless communications environment. Additionally, the wireless communications apparatus can comprise means for employing a fixed number of phases for the beam. Further, the wireless communications apparatus can comprise means for transmitting at least one of a Primary Synchronization Signal (PSS) or a Secondary Synchronization Signal (SSS) with the fixed number of phases for the beam.

Still another aspect relates to a computer program product comprising a computer-readable medium having stored thereon code causing at least one computer to identify a beam within a wireless communications environment, employ a fixed number of phases for the beam, and transmit at least one of a Primary Synchronization Signal (PSS) or a Secondary Synchronization Signal (SSS) with the fixed number of phases for the beam.

According to other aspects, a method that facilitates receiving a fixed set of beams and phases. The method can comprise identifying a fixed set of phases and beams. Further, the method can comprise receiving at least one of a Primary Synchronization Signal (PSS) or a Secondary Synchronization Signal (SSS).

Another aspect relates to a wireless communications apparatus. The wireless communications apparatus can include at least one processor configured to identify a fixed set of phases and beams, and receive at least one of a Primary Synchronization Signal (PSS) or a Secondary Synchronization Signal (SSS). Further, the wireless communications apparatus can include memory coupled to the at least one processor.

Another aspect relates to a wireless communications apparatus that receives a fixed set of beams and phases. The wireless communications apparatus can comprise means for identifying a fixed set of phases and beams. Moreover, the wireless communications apparatus can comprise means for receiving at least one of a Primary Synchronization Signal (PSS) or a Secondary Synchronization Signal (SSS).

Still another aspect relates to a computer program product comprising a computer-readable medium having stored thereon code for causing at least one computer to identify a fixed set of phases and beams, and receive at least one of a Primary Synchronization Signal (PSS) or a Secondary Synchronization Signal (SSS).

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
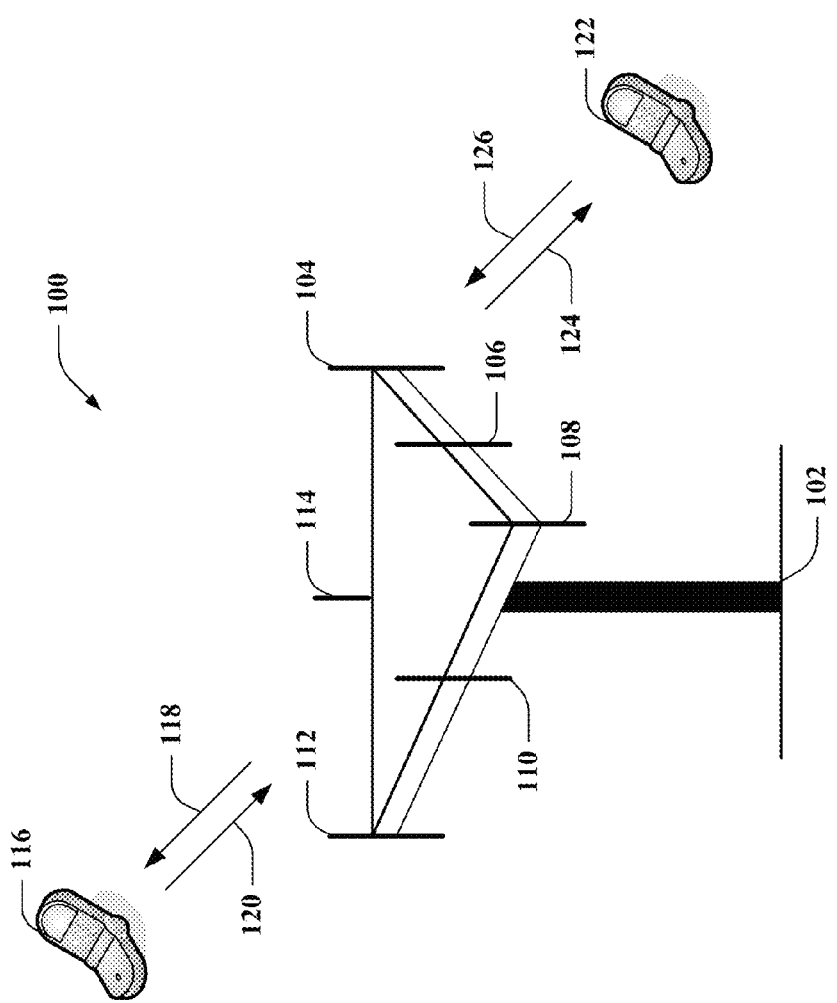
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "carrier," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g., mobile devices 116 and 122) upon a corresponding bandwidth. Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile Telecommunications System (UMTS), Wideband Code Division Multiple Access (W-CDMA), cdmaOne (IS-95), CDMA2000, Evolution-Data Optimized (EV-DO), Ultra Mobile Broadband (UMB), Worldwide Interoperability for Microwave Access (WiMAX), MediaFLO, Digital Multimedia Broadcasting (DMB), Digital Video Broadcasting-Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

The subject innovation can configure and employ a fixed set of beams and phases in order to transmit a Primary Synchronization Signal (PSS) and/or a Secondary Synchronization Signal (SSS). A constant phase offset on the PSS can be utilized in order to convey information to a user equipment. By utilizing the same phase offset for SSS as the phase offset for PSS, legacy user equipment will not be impacted or aware of the information conveyed. In other words, a first phase can be utilized for PSS and the first phase can be utilized for SSS. Non-legacy user equipment can receive the fixed set of beams and phases and receive the PSS and SSS. The non-legacy user equipment can estimate a channel based on reference signals in order to enable identification of the phase and the beam (from the fix set of beams and phases). It is to be appreciated that the fixed set of beams and phases can be pre-defined within the base station, the user equipment, and/or the network. Moreover, it is to be appreciated that the fixed set of beams and phases can be communicated wirelessly (e.g., over the air) in real time, dynamically, periodically, etc. Additionally, it is to be appreciated that the fixed set of beams and phases can be time varying (e.g., cycling through different sets of beams/phases).

The following example is for illustrative purposes only and is not to be limiting on the subject innovation. The example can relate to how the set of beams can be a linear combination of antenna ports for which RS is sent and the definition of how beam and phase translates to signal transmitted on the antenna ports. For example, consider a system 4 antenna ports for which reference signals are sent. The fixed set of beams could include two beams say [1 1 1 1] and [1 1 −1 −1] and two phases 0 and π. In this case depending on the information to be conveyed (e.g., two information bits for this example) the eNB could select from one of [1 1 1 1] (beam 1, phase 0), [−1 −1 −1 −1] (beam 1, phase π), [1 1 −1 −1] (beam 2, phase 0) and [−1 −1 1 1] (beam 2, phases π) [−1 −1 1 1]. (e.g., the set can be identified using the formula beam*exp(j phase)). Note that a beam of form [$a_1$ $a_2$ $a_3$ $a_4$] means that the signal multiplied by $a_n$ is sent from antenna port n. It is important to note that each of these beams can be identified from the linear combination of the antenna ports for which RS is sent. This can be done since the UE may only be able to estimate the channel corresponding to the antenna ports. The UE can detect the PSS, SSS and then estimate channel using RS. If in addition it is aware of the set of beams and phases used it can attempt to estimate the exact beam and phase used at the eNB and hence may be able to receive the two information bits.

Figure 2:
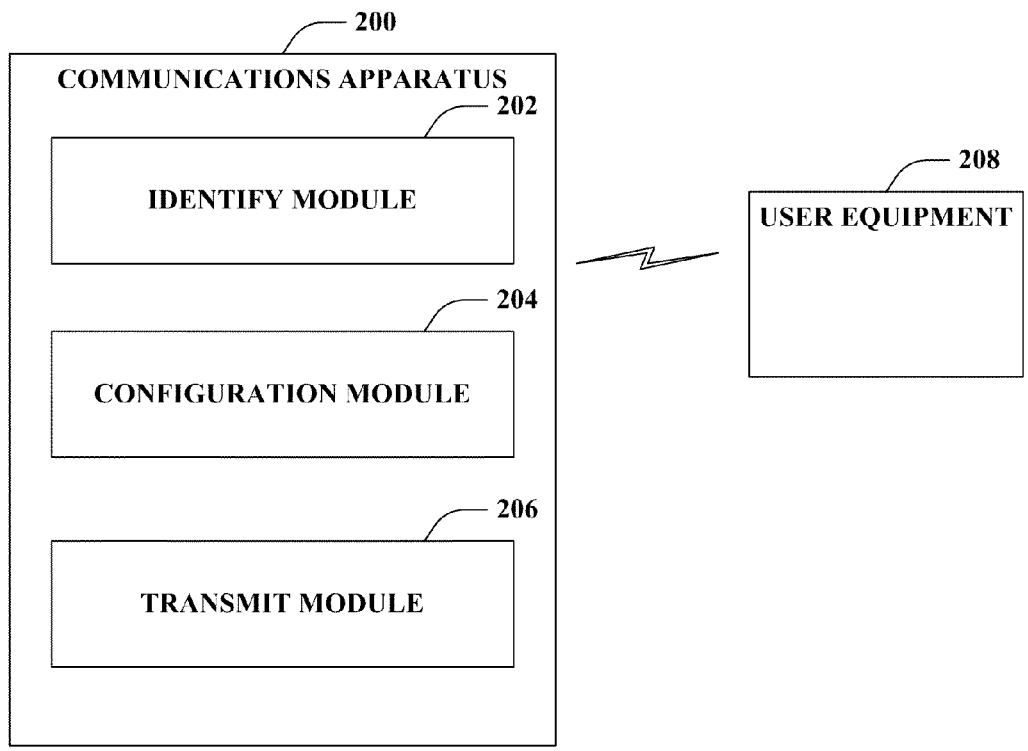
FIG. 2 is an illustration of an example communications apparatus for employment within a wireless communications environment.

Turning to FIG. 2, illustrated is a communications apparatus 200 for employment within a wireless communications environment. The communications apparatus 200 can be a base station or a portion thereof, a mobile device or a portion thereof, a network or a portion thereof, or substantially any communications apparatus that receives data transmitted in a wireless communications environment. In communications systems, the communications apparatus 200 employ components described below to employ a fixed set of beams and phases in which a constant phase offset can be utilized for Primary Synchronization Signal (PSS) and Secondary Synchronization Signal (SSS).

The subject innovation can convey information by introducing a constant phase offset on PSS relative to downlink reference signal (DL-RS) that depends on a message. Phase can be constant for a PSS instance and can be different for different PSS instances. It is to be appreciated that a legacy user equipment can be a user equipment that is non-compatible with more than four antenna ports. Moreover, a non-legacy user equipment can be a user equipment that can utilize or leverage more than four antenna ports. Moreover, a legacy user equipment can be user equipment with Long Term Evolution (LTE) technology and non-legacy user equipment can be a user equipment with LTE-advanced technology. To ensure legacy UEs are not impacted, the phase of SSS is chosen to be the same as the phase of PSS on that subframe. To enable new UEs to detect the phase, the PSS/SSS are sent on beams that are a combination of available antenna ports (for which RS is sent), wherein the new UE can be aware of the linear combination. From the RS observations, the UE can estimate the channels from the antenna ports. Since new UE is aware of the beam used to transmit PSS/SSS, the UE can get an estimate of the effective channel gain seen on PSS and SSS. Using this, the UE can estimate phase offset introduced on PSS. It is to be appreciated that the fixed set of beams and phases can be pre-defined within the base station, the user equipment, and/or the network. Moreover, it is to be appreciated that the fixed set of beams and phases can be communicated wirelessly (e.g., over the air) in real time, dynamically, periodically, etc.

The communications apparatus 200 can include an identify module 202. The identify module 202 can identify at least one beam within a wireless communications environment, wherein the beam can be a combination of available antenna ports. The communications apparatus 200 can further include a configuration module 204 that can configure and implement a fixed number of beams and phases, wherein the phase can be constant and/or fixed. In other words, the configuration module 204 can employ a phase offset for PSS and the same phase offset for SSS. It is to be appreciated that a fixed number of phases can be implemented for more than one beam within the wireless communications environment.

The communications apparatus 200 can further include a transmit module 206 that can leverage the fixed set of beams and phases in order transmit PSS and/or SSS. It is to be appreciated that the transmit module 206 can utilize the fixed set of beams and phases as well as the constant or fixed phase offset in order to convey information. The transmit module 206 can communicate such information to a user equipment 208 (e.g., a non-legacy user equipment that is compatible with more than four antennas). In other words, it is to be appreciated that a legacy user equipment (e.g., a user equipment that is non-compatible with identifying or utilizing more than four antennas) will not detect the fixed set of beams and phases and not be able to detect the phase offset associated with PSS and SSS. Thus, a non-legacy user equipment can detect the fixed set of beams and phases without impacting legacy user equipment.

The communications apparatus 200 can further employ a set of fixed beams (e.g., received or conveyed from linear combination of available reference signal (RS) ports). The set can be partitioned into subsets, wherein the subsets can be disjoint subsets. Further, information can be conveyed in the subset index. Moreover, based on the information to convey, the subset index can be identified (e.g., found) and a beam can be selected or chosen from the identified subset. PSS and/or SSS can be transmitted with the selected beam. Additionally, the PSS and/or SSS can be received and a channel can be estimated from the RS ports. The transmitted information can be identified based upon a decode for the subset index utilized.

It is to be appreciated that the conveyed information can be related to at least one of a number of antenna deployed in the wireless communication system or a type of a base station. Moreover, at least one phase or beam can be identified based upon the conveyed information. The subject innovation can further include identifying a set of fixed beams from linear combination of available reference signal ports, partitioning the set into disjoint subsets, and conveying information in the subset index. Additionally, the subject innovation can include identifying a subset index based on information to convey, selecting a beam from at least one of the disjoint subset, and communicating at least one of PSS or SSS with the beam.

Moreover, although not shown, it is to be appreciated that communications apparatus 200 can include memory that retains instructions with respect to identifying a beam within a wireless communications environment, employing a fixed number of phases for the beam, transmitting at least one of a Primary Synchronization Signal (PSS) or a Secondary Synchronization Signal (SSS) with the fixed number of phases for the beam, and the like. Further, communications apparatus 200 can include a processor that may be utilized in connection with executing instructions (e.g., instructions retained within memory, instructions obtained from a disparate source, . . . ).

Additionally, although not shown, it is to be appreciated that communications apparatus 200 can include memory that retains instructions with respect to receiving a fixed set of phases and beams, receiving at least one of a Primary Synchronization Signal (PSS) or a Secondary Synchronization Signal (SSS), and the like. Further, communications apparatus 200 can include a processor that may be utilized in connection with executing instructions (e.g., instructions retained within memory, instructions obtained from a disparate source, . . . ).

Figure 3:
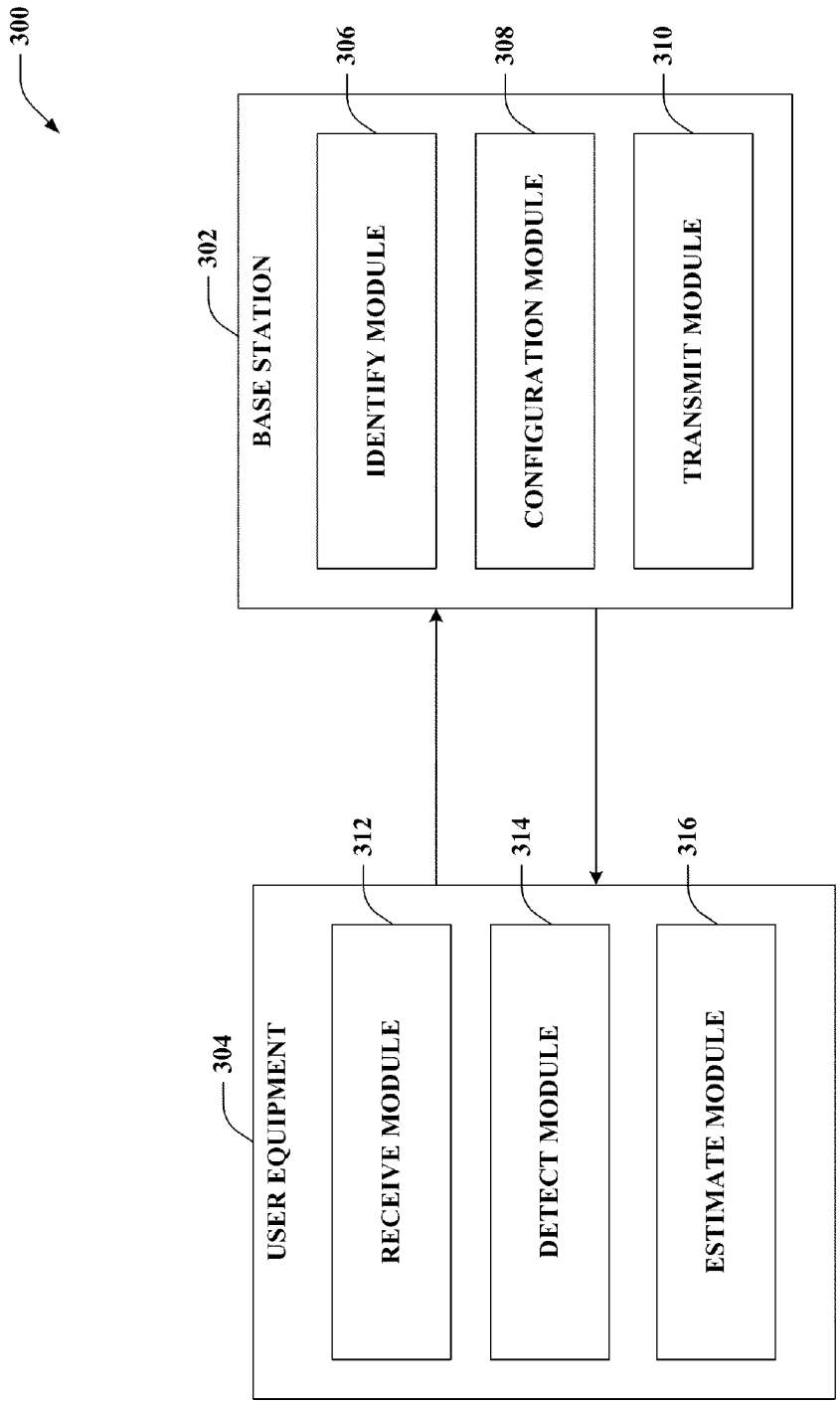
FIG. 3 is an illustration of an example wireless communications system that facilitates conveying information to a user equipment (UE) with Primary Synchronization Signal (PSS).

Now referring to FIG. 3, illustrated is a wireless communications system 300 that can convey information to a user equipment (UE) with Primary Synchronization Signal (PSS). The system 300 includes a base station 302 that communicates with a user equipment 304 (and/or any number of disparate user equipment (not shown)). Base station 302 can transmit information to user equipment 304 over a forward link channel; further base station 302 can receive information from user equipment 304 over a reverse link channel. Moreover, system 300 can be a MIMO system. Additionally, the system 300 can operate in an OFDMA wireless network, a 3GPP LTE wireless network, etc. Also, the components and functionalities shown and described below in the base station 302 can be present in the mobile device 304 as well and vice versa, in one example; the configuration depicted excludes these components for ease of explanation.

Base station 302 includes an identify module 306 that can evaluate and identify at least one beam within a wireless communications environment or system. It is to be appreciated that a beam can be, for instance, a combination of available antenna ports for a user equipment. The base station 302 can further include a configuration module 308 that can implement a fixed set of beams and phases. In particular, a fixed set of beams and phases can be configured in which a constant phase offset can be utilized for Primary Synchronization Signal (PSS) and/or Secondary Synchronization Signal (SSS).

It is to be appreciated that the phase offset can be substantially similar for PSS and SSS (e.g., the same offset can be utilized for PSS and SSS). Moreover, it is to be appreciated that the subject innovation can implement a specific phase offset for each beam within the wireless communications environment. In other words, there can be a plurality of phase offsets that correspond to a plurality of beams. It is to be appreciated that the fixed set of beams and phases can be pre-defined within the base station, the user equipment, and/or the network. Moreover, it is to be appreciated that the fixed set of beams and phases can be communicated wirelessly (e.g., over the air) in real time, dynamically, periodically, etc.

The base station 302 can further include a transmit module 310 that can communicate or convey PSS and/or SSS with the fixed set of beams and phases. In other words, the transmit module 310 can convey information utilizing the constant phase offset (for the fixed set of beams and phases) employed with PSS and/or SSS.

User equipment 304 can include a receive module 312 that can receive a fixed set of beams and phases (e.g., a fixed number of beams and phases). The user equipment 304 can include a detect module 314 that can identify and/or receive a Primary Synchronization Signal (PSS) and/or a Secondary Synchronization Signal (SSS). The user equipment 304 can include an estimate module 316 that can calculate a channel estimate based upon a downlink reference signal (DL-RS). Based on the channel estimate, the estimate module 316 can identify the beams and phases from the fixed set of beams and phases. In particular, the estimate module 316 can identify the phase offset utilized for PSS and SSS.

The primary synchronization signal (PSS) can be a length 62 sequence that is transmitted by an LTE base station once every 5 ms (milliseconds). There are three possible PSS sequences and the sequence transmitted depends on the physical cell ID of the base station. The subject innovation can convey information by introducing a phase offset on PSS relative to the phase of downlink Reference Signal (DL-RS). Information can be conveyed by letting the PSS sequence ($s_1$, $s_2$, $s_3$, ... $s_{62}$) to be transmitted with some phase shifts as S1 $e^{j\Phi}=(s_1 e^{j\Phi}, s_2 e^{j\Phi}, s_3 e^{j\Phi}, \ldots s_{62} e^{j\Phi})$. An example to convey 2 bits of information through the phase is shown below in Table 1 (e.g., 4 phases on one beam):

TABLE 1

| Bit 0 | Bit 1 | Transmitted PSS Signal (SSS also has same phase shift) |
|---|---|---|
| 0 | 0 | S1 |
| 0 | 1 | S1 $e^{j\pi/2}$ = j S1 |
| 1 | 0 | S1 $e^{j\pi}$ = −S1 |
| 1 | 1 | S1 $e^{j3\pi/2}$ = −j S1 |

The key advantage of using PSS phase to transmit information is that LTE Release 8 UEs are not aware of the phase in PSS and are not affected by it. This is therefore suitable to convey information to new UEs without impacting legacy UEs. For example this could be used to convey 1 bit of information, whether the system has 8 transmit antennas or not, or to tell UE that this is an LTE A base station, etc.

To enable transmission of information through PSS, it needs to be ensured that the change proposed to PSS does not affect performance of legacy devices that are not aware of the phase introduced on PSS. It may also be ensured that new UEs are able to differentiate between the different phases sent on PSS.

The claimed subject innovation does not affect the performance of legacy UEs. PSS is the first signal the UE searches for in order to detect a base station and hence the PSS detection is performed non-coherently (e.g., without knowing the channel estimate). Typically the detection involves convolving the received sequence over a period of time (e.g., 5 ms) with the 3 different possible transmitted PSS sequences and analyzing the absolute value (or magnitude) of the convolution output. Convolving can involve correlating for every possible start hypothesis of PSS. The analysis could be looking for peaks for example. Since the magnitude of the convolution output is not impacted by a change in the phase of the PSS, the PSS detectors performance is unchanged.

Some detectors may also combine the outputs corresponding to different PSS sequences. The detectors can combine the convolution output for 5 ms of received signals with the convolution output of next 5 ms and so on. However, since the PSS transmissions are spaced 5 ms apart, even if correlations for different PSS sequences are combined they are done non coherently (typically square and add the magnitude). In fact, only non-coherent combining of correlation outputs of PSS is allowed since legacy UEs have to supports VTSTD (Time Switched Transmit Diversity—different antennas ports used for different PSS instances). Hence introducing the phase offset on PSS does not impact legacy UEs.

After PSS is decoded, the UE searches for the secondary synchronization signal. The SSS is also a length 62 sequence that is transmitted by an LTE base station once every 5 ms (milliseconds) and it can take 167 different values. SSS can also be decoded non-coherently however due to its proximity to the PSS, it is possible for UEs to get a channel estimate using PSS as pilots and use that channel estimate to decode SSS in a coherent manner. In coherent decoding the phase of the signal plays a crucial role. If the phase of the PSS and SSS are kept the same, the SSS detector will continue to function as before.

After decoding PSS/SSS, the UE knows the location of the reference signal. For decoding all other downlink channels the UE gets an estimate of the channel from RS and uses that channel estimate to decode those channels. Since no changes are made to RS and other channels they are not impacted. It is noted that channel estimate may or may not be done using RS, PSS, SSS simultaneously. For example, RS are sent on possibly 4 antenna ports while PSS, SSS are sent on a direction that is unknown to the legacy UE.

If the new UE is aware of the beam in which the PSS/SSS is sent, after channel estimate is available through RS, it is straightforward to detect the phase of the PSS. The detection can make use of the fact the PSS and SSS make use of the same phase. For example, if Y=vector corresponding to received PSS, SSS and X=Sequence corresponding to PSS, SSS (without phase information), the Transmitted sequence will be $Xe^{j\phi}$. H=effective channel gain seen on PSS/SSS—Obtained by using channel estimate from RS observations and using the knowledge of the beam direction of PSS/SSS. A detector could use the following:

$$\hat{\phi} = \arg\min_\phi |Y - e^{j\phi} HX|^2,$$

where the minimization with respect to $\phi$ is done over the set of possible phase offsets.

It should be noted that legacy UEs are not aware of the beam used to transmit the PSS/SSS. The new UE have to be aware of the beam used by the eNodeB for them to be able to decode the phase. This could be made possible for example by fixing the beams used by the eNodeB to a fixed set of linear combination of the available antenna ports and choosing the beam to be used on a particular PSS instance to depend on parameters that the new UE can determine through PSS,SSS, PBCH. Parameters like subframe index, radio frame number modulo 4, physical cell ID of eNB etc. As a simple example the base station could use just 2 beams, beam 1 for PSS/SSS on subframe 0 and beam 2 for PSS/SSS on subframe 5.

In general, the subject innovation can convey information by introducing a constant phase offset on PSS relative to DL-RS that depends on the message. Phase is constant for a PSS instance and can be different for different PSS instances. The phase of SSS should be the same as the phase of PSS on that subframe to ensure legacy UEs are not impacted. To enable new UEs to detect the phase, the PSS/SSS should be sent on beams that are a combination of available antenna ports (for which RS is sent) and the new UE should be aware of the linear combination. Time varying information can be conveyed by changing the phase of PSS on different instances.

Moreover, although not shown, it is to be appreciated that base station 302 can include memory that retains instructions with respect to identifying a beam within a wireless communications environment, employing a fixed number of phases for the beam, transmitting at least one of a Primary Synchronization Signal (PSS) or a Secondary Synchronization Signal (SSS) with the fixed number of phases for the beam, and the like. Further, base station 302 can include a processor that may be utilized in connection with executing instructions (e.g., instructions retained within memory, instructions obtained from a disparate source, . . . ).

Additionally, although not shown, it is to be appreciated that user equipment 304 can include memory that retains instructions with respect to receiving a fixed set of phases and beams, receiving at least one of a Primary Synchronization Signal (PSS) or a Secondary Synchronization Signal (SSS), and the like. Further, user equipment 304 can include a processor that may be utilized in connection with executing instructions (e.g., instructions retained within memory, instructions obtained from a disparate source, . . . ).

Figure 4:
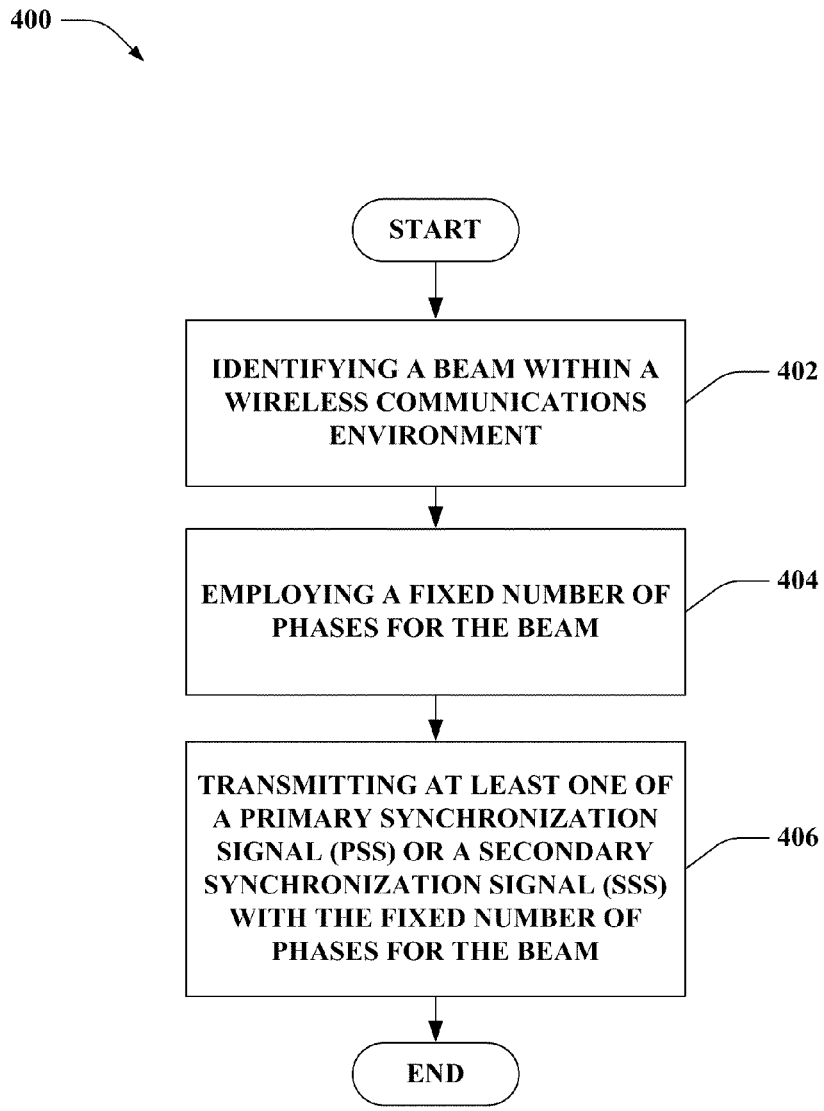
FIG. 4 is an illustration of an example methodology that facilitates configuring a fix set of beams and phases for transmitting Primary Synchronization Signal (PSS) and Secondary Synchronization Signal (SSS).
Figure 5:
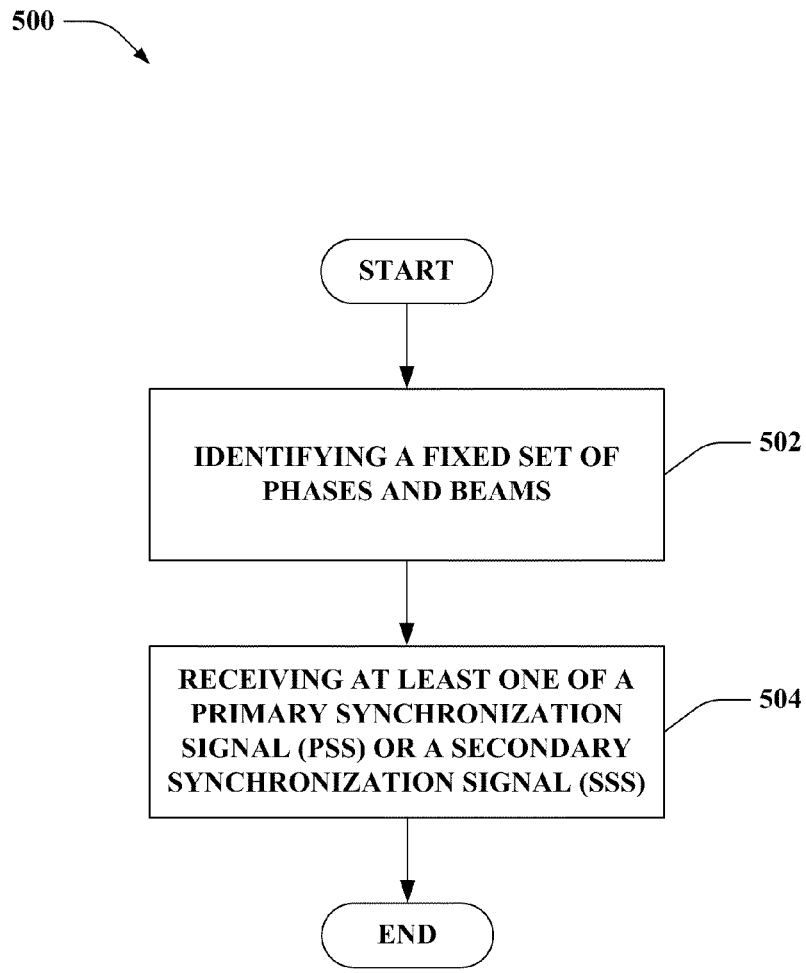
FIG. 5 is an illustration of an example methodology that facilitates receiving a fixed set of beams and phases.

Referring to FIGS. 4-5, methodologies relating to conveying information utilizing PSS are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 4, illustrated is a methodology 400 that facilitates configuring a fix set of beams and phases for transmitting Primary Synchronization Signal (PSS) and Secondary Synchronization Signal (SSS). At reference numeral 402, a beam can be identified within a wireless communications environment. At reference numeral 404, a fixed number of phases for the beam can be employed. At reference numeral 406, at least one of a Primary Synchronization Signal (PSS) or a Secondary Synchronization Signal (SSS) can be transmitted with the fixed number of phases for the beam.

Now referring to FIG. 5, a methodology 500 that facilitates receiving a fixed set of beams and phases. At reference numeral 502, a fixed set of phases and beams can be identified. For instance, the fixed set of phases and beams can be pre-defined (e.g., within a user equipment, a base station, a network, etc.) or communicated wirelessly. At reference numeral 504, at least one of a Primary Synchronization Signal (PSS) or a Secondary Synchronization Signal (SSS) can be received. Moreover, although not shown, the methodology 500 can include identifying the PSS and/or SSS without the knowledge of beams and phases. Additionally, the methodology 500 can further include estimating a channel based upon a reference signal and identifying the beam and the phase (from the fix set of beams and phases) based upon the channel estimate.

Figure 6:
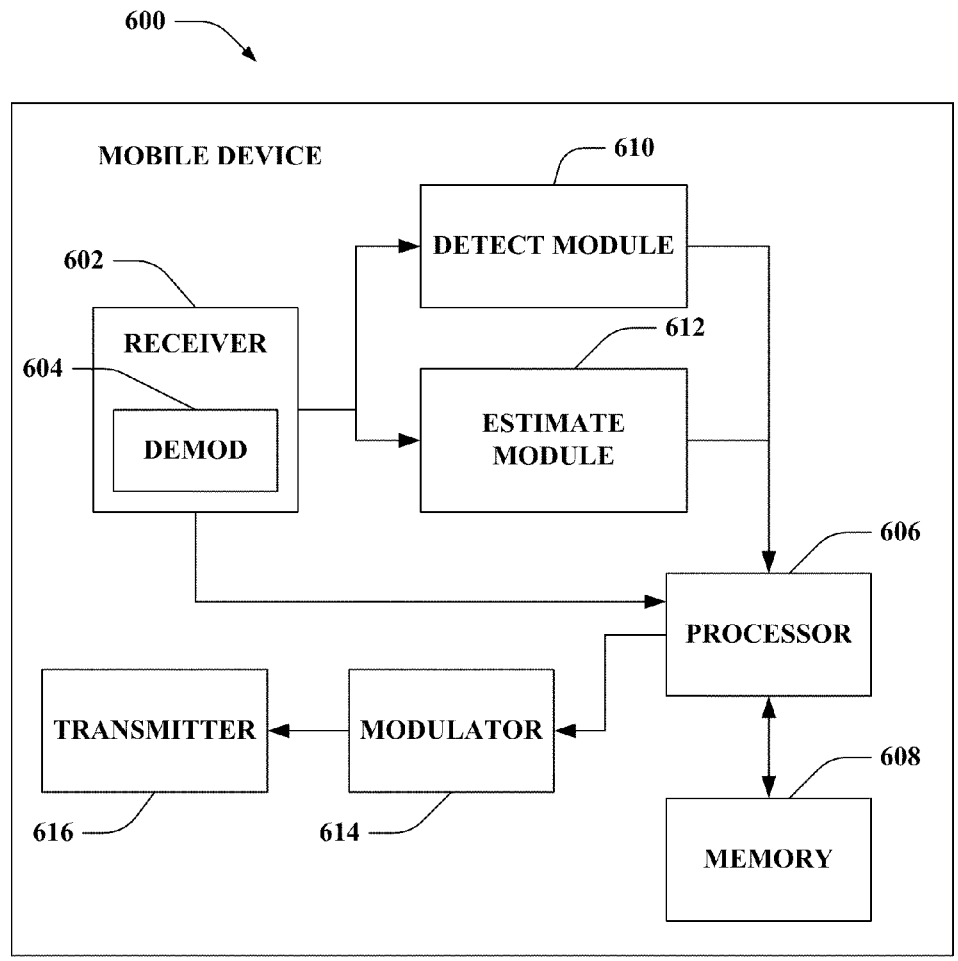
FIG. 6 is an illustration of an example mobile device that facilitates estimating a channel in order to identify a beam and a phase in a wireless communication environment.

FIG. 6 is an illustration of a mobile device 600 that facilitates estimating a channel in order to identify a beam and a phase in a wireless communication system. Mobile device 600 comprises a receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to a processor 606 for channel estimation. Processor 606 can be a processor dedicated to analyzing information received by receiver 602 and/or generating information for transmission by a transmitter 616, a processor that controls one or more components of mobile device 600, and/or a processor that both analyzes information received by receiver 602, generates information for transmission by transmitter 616, and controls one or more components of mobile device 600.

Mobile device 600 can additionally comprise memory 608 that is operatively coupled to processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.).

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Processor 606 can further be operatively coupled to a detect module 610 and/or an estimate module 612. Although not shown, the system 600 can further include a feedback module that can be utilized for phase beam estimation in which such feedback module can be from the estimate module 612 to the identify module 610. The detect module 610 can receive and/or identify a fixed set of beams and phases (including a constant or fixed phase offset for PSS and/or SSS) as well as a PSS and/or a SSS. The estimate module 612 can perform a channel estimate based upon a downlink reference signal (DL-RS), wherein the channel estimate can be utilized to identify at least one of the beam from the fixed set of beams, the phase from the fixed set of phases, and/or the phase offset.

Mobile device 600 still further comprises a modulator 614 and transmitter 616 that respectively modulate and transmit signals to, for instance, a base station, another mobile device, etc. Although depicted as being separate from the processor 606, it is to be appreciated that the detect module 610, estimate module 612, demodulator 604, and/or modulator 614 can be part of the processor 606 or multiple processors (not shown).

Figure 7:
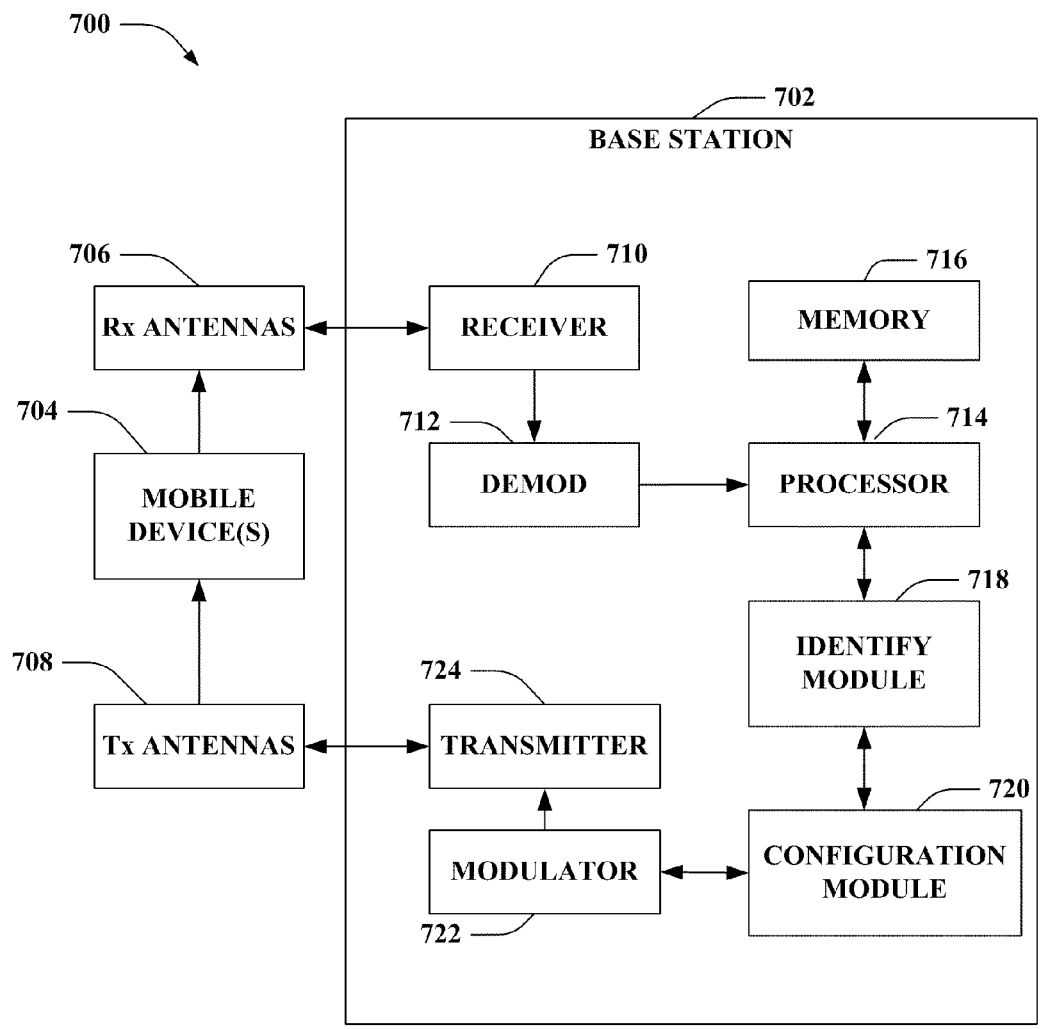
FIG. 7 is an illustration of an example system that facilitates utilizing a fixed beam and phase to transmit PSS and SSS in a wireless communication environment.

FIG. 7 is an illustration of a system 700 that facilitates utilizing a fixed beam and phase to transmit PSS and SSS in a wireless communication environment as described supra. The system 700 comprises a base station 702 (e.g., access point, . . . ) with a receiver 710 that receives signal(s) from one or more mobile devices 704 through a plurality of receive antennas 706, and a transmitter 724 that transmits to the one or more mobile devices 704 through a transmit antenna 708. Receiver 710 can receive information from receive antennas 706 and is operatively associated with a demodulator 712 that demodulates received information. Demodulated symbols are analyzed by a processor 714 that can be similar to the processor described above with regard to FIG. 6, and which is coupled to a memory 716 that stores information related to estimating a signal (e.g., pilot) strength and/or interference strength, data to be transmitted to or received from mobile device(s) 704 (or a disparate base station (not shown)), and/or any other suitable information related to performing the various actions and functions set forth herein.

Processor 714 is further coupled to an identify module 718 and/or a configuration module 720. The identify module 718 can detect at least one beam related to a wireless environment, wherein a beam can be one or a combination of available antenna port(s). The configuration module 720 can implement a constant phase offset for PSS and SSS. Moreover, the configuration module 720 can employ a fixed set of beams and phases to communicate PSS and/or SSS. It is to be appreciated that the phase offset for PSS and SSS can be constant or fixed. In other words, the phase offset for PSS and SSS can be the same or identical in numeric value. Furthermore, although depicted as being separate from the processor 714, it is to be appreciated that the identify module 718, the configuration module 720, demodulator 712, and/or modulator 722 can be part of the processor 714 or multiple processors (not shown).

Figure 8:
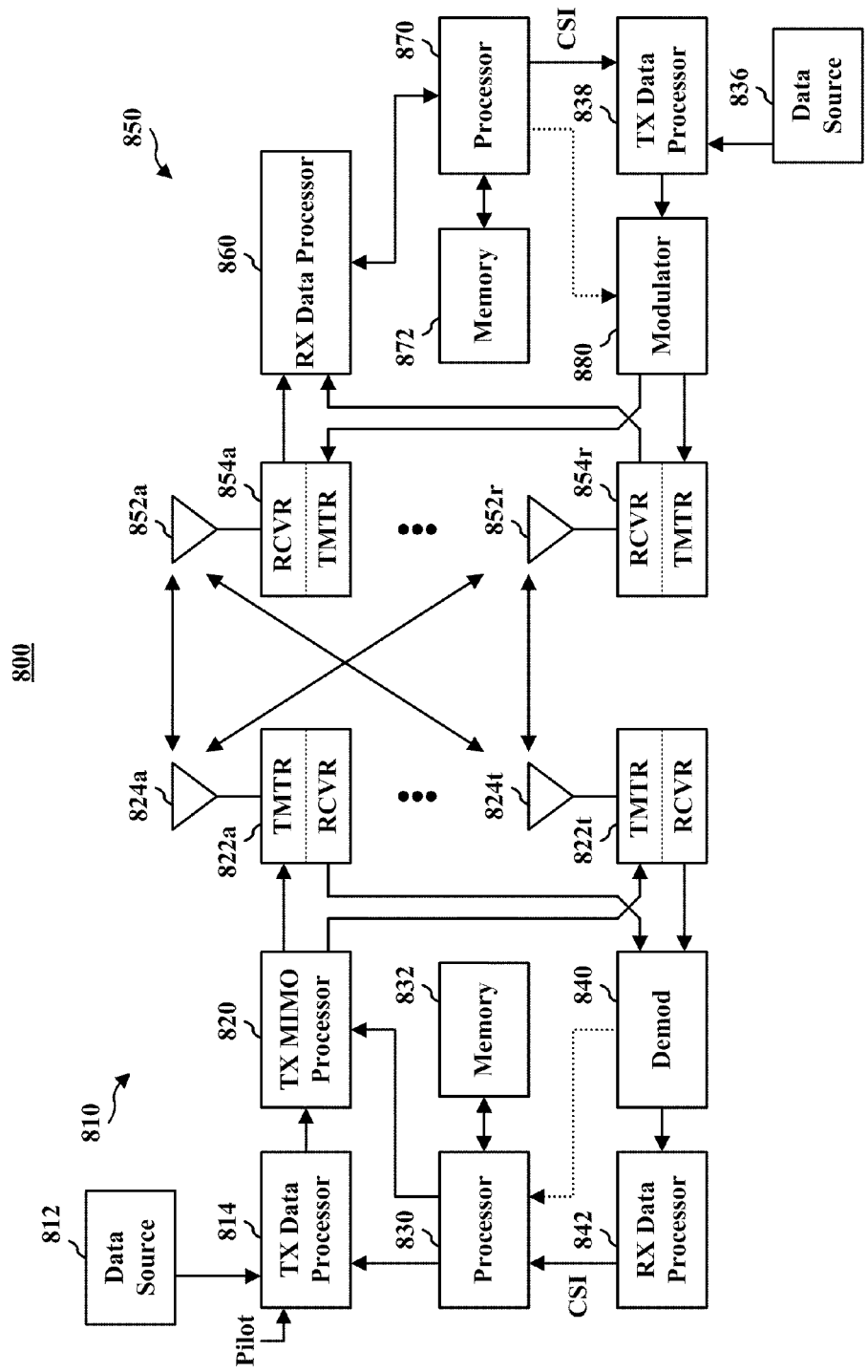
FIG. 8 is an illustration of an example wireless network environment that can be employed in conjunction with the various systems and methods described herein.

FIG. 8 shows an example wireless communication system 800. The wireless communication system 800 depicts one base station 810 and one mobile device 850 for sake of brevity. However, it is to be appreciated that system 800 can include more than one base station and/or more than one mobile device, wherein additional base stations and/or mobile devices can be substantially similar or different from example base station 810 and mobile device 850 described below. In addition, it is to be appreciated that base station 810 and/or mobile device 850 can employ the systems (FIGS. 1-3 and 6-7), and/or methods (FIGS. 4-5) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted.

Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At mobile device 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which precoding matrix to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from mobile device 850 are received by antennas 824, conditioned by receivers 822, demodulated by a demodulator 840, and processed by a RX data processor 842 to extract the reverse link message transmitted by mobile device 850. Further, processor 830 can process the extracted message to determine which precoding matrix to use for determining the beamforming weights.

Processors 830 and 870 can direct (e.g., control, coordinate, manage, etc.) operation at base station 810 and mobile device 850, respectively. Respective processors 830 and 870 can be associated with memory 832 and 872 that store program codes and data. Processors 830 and 870 can also perform computations to derive frequency and impulse response estimates for the uplink and downlink, respectively.

It is to be understood that the embodiments described herein can be implemented in hardware, software, firmware, middleware, microcode, or any combination thereof For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
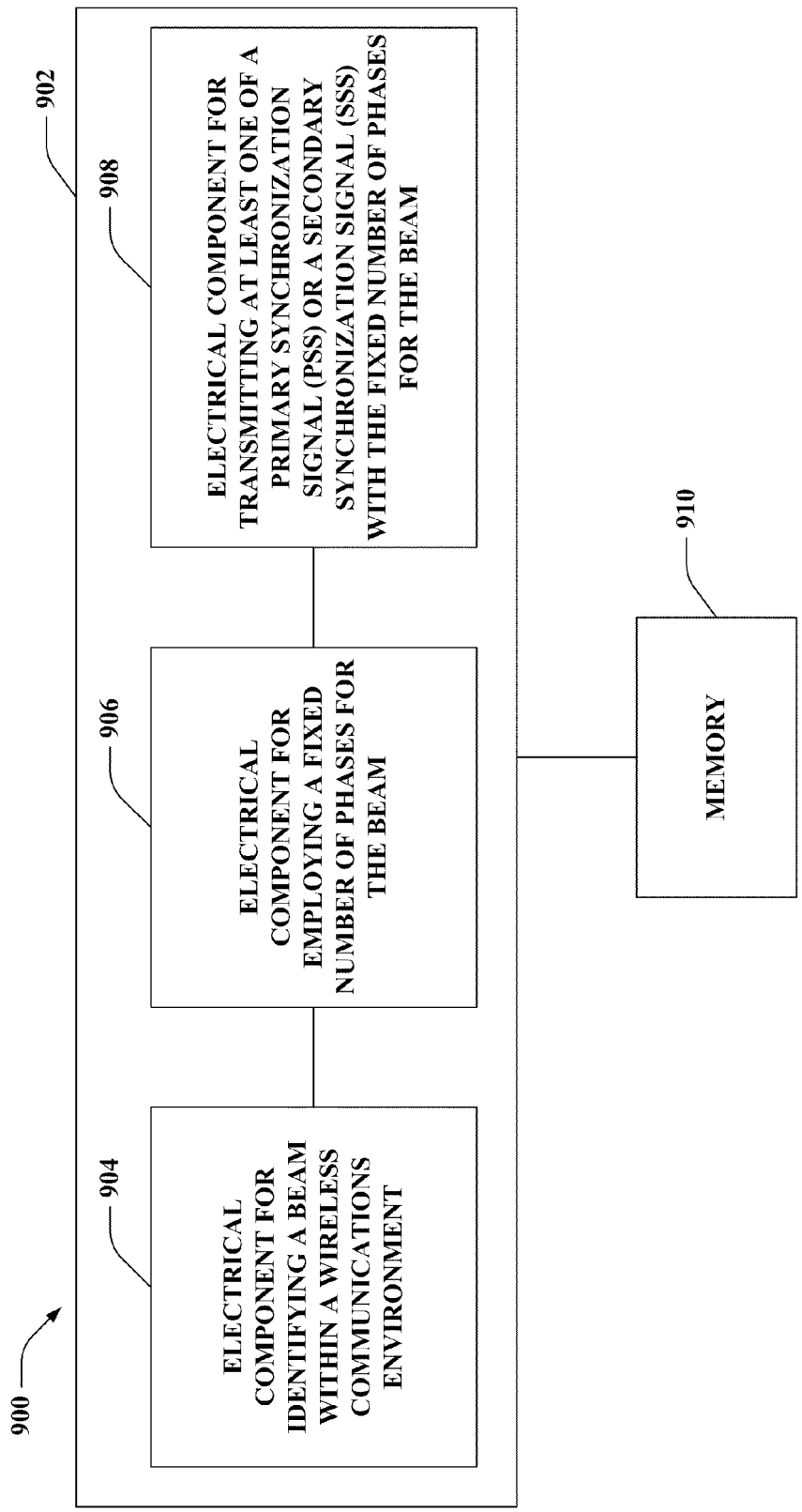
FIG. 9 is an illustration of an example system that facilitates conveying information to a user equipment (UE) with Primary Synchronization Signal (PSS).

With reference to FIG. 9, illustrated is a system 900 that conveys information to a user equipment (UE) with Primary Synchronization Signal (PSS). For example, system 900 can reside at least partially within a base station, mobile device, etc. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. The logical grouping 902 can include an electrical component for identifying a beam within a wireless communications environment 904. In addition, the logical grouping 902 can comprise an electrical component for employing a fixed number of phases for the beam 906. Moreover, the logical grouping 902 can include an electrical component for transmitting at least one of a Primary Synchronization Signal (PSS) or a Secondary Synchronization Signal (SSS) with the fixed number of phases for the beam 908. Additionally, system 900 can include a memory 910 that retains instructions for executing functions associated with electrical components 904, 906, and 908. While shown as being external to memory 910, it is to be understood that one or more of electrical components 904, 906, and 908 can exist within memory 910.

Figure 10:
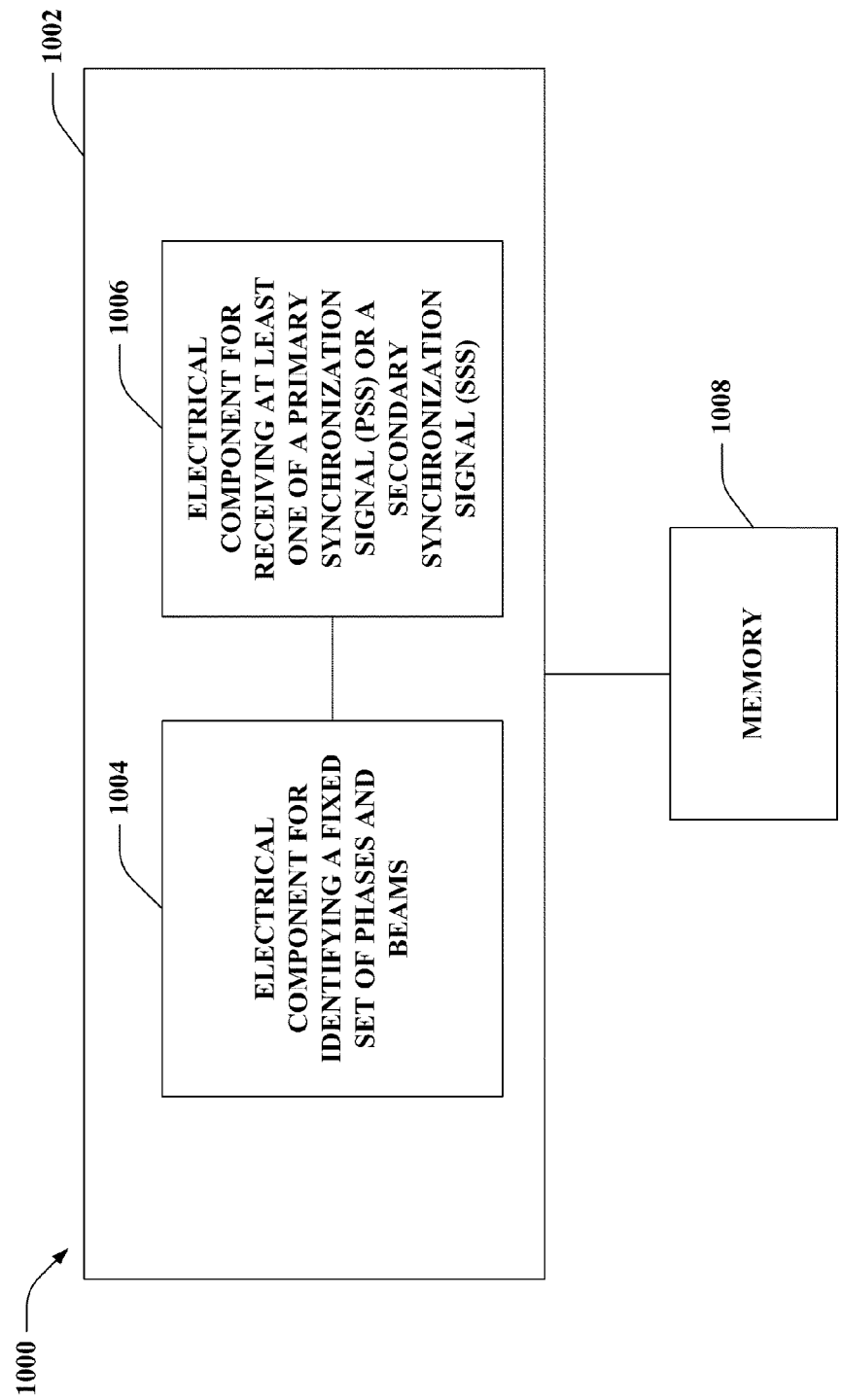
FIG. 10 is an illustration of an example system that receives information via a Primary Synchronization Signal (PSS) in a wireless communication environment.

Turning to FIG. 10, illustrated is a system 1000 receives information via a Primary Synchronization Signal (PSS) in a wireless communications network. System 1000 can reside within a base station, mobile device, etc., for instance. As depicted, system 1000 includes functional blocks that can represent functions implemented by a processor, software, or combination thereof (e.g., firmware). Logical grouping 1002 can include an electrical component for identifying a fixed set of phases and beams 1004. For instance, the fixed set of phases and beams can be pre-defined (e.g., within a user equipment, a base station, a network, etc.) or communicated wirelessly. Moreover, logical grouping 1002 can include an electrical component for receiving at least one of a Primary Synchronization Signal (PSS) or a Secondary Synchronization Signal (SSS) 1006. Additionally, system 1000 can include a memory 1008 that retains instructions for executing functions associated with electrical components 1004 and 1006. While shown as being external to memory 1008, it is to be understood that electrical components 1004 and 1006 can exist within memory 1008.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method used in a wireless communications system, comprising:
   identifying a beam within a wireless communications environment;
   employing a fixed number of phases for the beam; and
   transmitting at least one of a Primary Synchronization Signal (PSS) or a Secondary Synchronization Signal (SSS) with the fixed number of phases for the beam; and
   utilizing the fixed number of phases for the beam to convey information to a User Equipment (UE),
   wherein the conveyed information is related to a number of antennas deployed in the wireless communication system.

2. The method of claim 1, further comprising employing the fixed number of phases for more than one beam within the wireless communications environment.

3. The method of claim 1, further comprising employing the fixed number of phases for the beam such that the fixed number of phases is relative to a downlink reference signal.

4. The method of claim 1, further comprising utilizing a first phase for the PSS within a subframe and the first phase for the SSS within the subframe.

5. The method of claim 1, wherein the beam is at least one of an available antenna port or a combination of available antenna ports.

6. The method of claim 1, further comprising transmitting at least one of the PSS or the SSS the UE that is compatible with more than four antenna ports.

7. The method of claim 1, further comprising identifying at least one phase or beam based upon the conveyed information.

8. The method of claim 1, further comprising:
   identifying a set of fixed beams from linear combination of available reference signal ports;
   partitioning the set into disjoint subsets; and
   conveying information in a subset index.

9. The method of claim 8, further comprising:
   identifying the subset index based on the information to convey;
   selecting the beam from at least one of the disjoint subsets; and
   communicating at least one of the PSS or the SSS with the beam.

10. The method of claim 1, further comprising keeping phase of the PSS and the SSS identical.

11. A wireless communications apparatus, comprising:
   at least one processor configured to:
      identify a beam within a wireless communications environment;
      employ a fixed number of phases for the beam;
      transmit at least one of a Primary Synchronization Signal (PSS) or a Secondary Synchronization Signal (SSS) with the fixed number of phases for the beam;
      utilize the fixed number of phases for the beam to convey information to a User Equipment (UE), wherein the conveyed information is related to a number of antennas deployed in the wireless communications environment; and
   a memory coupled to the at least one processor.

12. The wireless communications apparatus of claim 11, further comprising the at least one processor configured to employ the fixed number of phases for more than one beam within the wireless communications environment.

13. The wireless communications apparatus of claim 11, further comprising the at least one processor configured to employ the fixed number of phases for the beam such that the fixed number of phases is relative to a downlink reference signal.

14. The wireless communications apparatus of claim 11, further comprising the at least one processor configured to utilize a first phase for the PSS within a subframe and the first phase for the SSS within the subframe.

15. The wireless communications apparatus of claim 11, wherein the beam is at least one of an available antenna port or a combination of available antenna ports.

16. The wireless communications apparatus of claim 11, further comprising the at least one processor configured to transmit at least one of the PSS or the SSS the UE that is compatible with more than four antenna ports.

17. The wireless communications apparatus of claim 16, further comprising the at least one processor configured to identify at least one phase or beam based upon the conveyed information.

18. The wireless communications apparatus of claim 11, further comprising:
   the at least one processor configured to:
      identify a set of fixed beams from linear combination of available reference signal ports;
      partition the set into disjoint subsets; and
      convey information in a subset index.

19. The wireless communications apparatus of claim 18, further comprising:
   the at least one processor configured to:
      identify the subset index based on information to convey;
      select the beam from at least one of the disjoint subsets; and
      communicate at least one of PSS or SSS with the beam.

20. The wireless communications apparatus of claim 11, further comprising keeping phase of the PSS and the SSS identical.

21. A computer program product, comprising:
   a non-transitory computer-readable medium comprising:
      code for causing the at least one computer to identify a beam within a wireless communications environment;
      code for causing the at least one computer to employ a fixed number of phases for the beam;
      code for causing the at least one computer to utilizing the fixed number of phases for the beam to convey information to a User Equipment (UE), wherein the conveyed information is related to a number of antennas deployed in the wireless communications environment; and
      code for causing the at least one computer to transmit at least one of a Primary Synchronization Signal (PSS) or a Secondary Synchronization Signal (SSS) with the fixed number of phases for the beam.

22. The computer program product of claim 21, wherein the non-transitory computer-readable medium further comprises:
   code for keeping phase of the PSS and the SSS identical.

23. A method used in a wireless communications system, comprising:
   identifying a fixed set of phases and beams;
   receiving at least one of a Primary Synchronization Signal (PSS) or a Secondary Synchronization Signal (SSS); and identifying a phase offset associated with the PSS, wherein the phase offset conveys information relating to a number of antennas deployed in the wireless communications system.

24. The method of claim 23, further comprising identifying at least one of the PSS or the SSS without knowledge of the fixed set of phases and beams.

25. The method of claim 23, further comprising estimating a channel based upon a reference signal.

26. The method of claim 23, further comprising identifying a beam and a phase from the fixed set of phases and beams based upon a channel estimate.

27. The method of claim 23, further comprising estimating a channel gain on the PSS and the SSS based upon at least one received beam.

28. The method of claim 23, further comprising:
estimating a channel from at least one reference signal port; and
decoding a subset index utilized to identify transmitted information.

29. A wireless communications apparatus, comprising:
at least one processor configured to:
identify a fixed set of phases and beams;
receive at least one of a Primary Synchronization Signal (PSS) or a Secondary Synchronization Signal (SSS);
identify a phase offset associated with the PSS, wherein the phase offset conveys information relating to a number of antennas deployed in a wireless communications system; and
a memory coupled to the at least one processor.

30. The wireless communications apparatus of claim 29, wherein the at least one processor is further configured to identify the at least one of the PSS or the SSS without the fixed set of phases and beams.

31. The wireless communications apparatus of claim 29, wherein the at least one processor is further configured to estimate a channel based upon a reference signal.

32. The wireless communications apparatus of claim 29, wherein the at least one processor is further configured to identify a beam and a phase from the fixed set of phases and beams based upon a channel estimate.

33. The wireless communications apparatus of claim 29, wherein the at least one processor is further configured to:
estimate a channel from at least one reference signal port; and
decode a subset index utilized to identify transmitted information.

34. A computer program product, comprising:
a non-transitory computer-readable medium comprising:
code for causing the at least one computer to identify a fixed set of phases and beams; and
code for causing the at least one computer to receive at least one of a Primary Synchronization Signal (PSS) or a Secondary Synchronization Signal (SSS); and
code for causing the at least one computer to identify a phase offset associated with the PSS, wherein the phase offset conveys information relating to a number of antennas deployed in the wireless communications system.

* * * * *